United States Patent
Starzynski

(10) Patent No.: US 8,485,032 B2
(45) Date of Patent: Jul. 16, 2013

(54) METHODS AND APPARATUS FOR IMPROVING PERFORMANCE OF AN ACCELEROMETER

(75) Inventor: John S. Starzynski, North Bend, WA (US)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 13/047,008

(22) Filed: Mar. 14, 2011

(65) Prior Publication Data

US 2012/0234094 A1 Sep. 20, 2012

(51) Int. Cl.
*G01P 15/10* (2006.01)
(52) U.S. Cl.
USPC ..................... 73/514.29; 73/514.01
(58) Field of Classification Search
USPC ............ 73/514.01, 514.29, 514.32, 514.36, 73/514.37
See application file for complete search history.

(56) References Cited

U.S. PATENT DOCUMENTS

| | | | | |
|---|---|---|---|---|
| 5,265,474 A | * | 11/1993 | Chaffin et al. | 73/514.35 |
| 7,533,570 B2 | * | 5/2009 | Yamaguchi et al. | 73/514.32 |
| 2005/0118403 A1 | | 6/2005 | Anazawa et al. | |
| 2007/0158768 A1 | | 7/2007 | Pilchowski et al. | |

\* cited by examiner

*Primary Examiner* — John Chapman, Jr.
(74) *Attorney, Agent, or Firm* — Lowe Graham Jones PLLC

(57) ABSTRACT

An accelerometer for reducing undesired attraction or repulsion forces between a proof mass and a cover. An exemplary accelerometer includes a proof mass, a base, a flexure that flexibly attaches the proof mass to the base, at least one double-ended tuning fork (DETF) attached at one end to the proof mass and at another end to the base, and a housing structure that encloses the proof mass within a cavity. A layer of graphene is located on at least a portion of the nonconductive surfaces within the housing structure. The nonconductive surfaces include a surface on the proof mass, the housing structure, the base, the flexure, or the DETF. The layer of graphene is attached to a heat sink and/or to an electrical charge dissipation component.

7 Claims, 1 Drawing Sheet

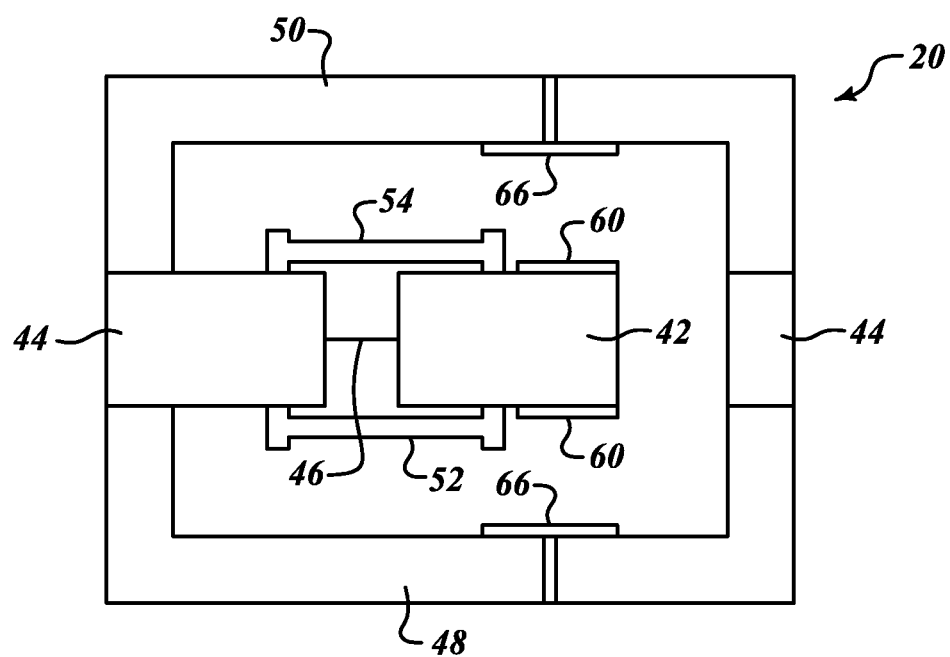

METHODS AND APPARATUS FOR IMPROVING PERFORMANCE OF AN ACCELEROMETER

GOVERNMENT INTEREST

The invention described herein was made in the performance of work under U.S. Government Contract No. FA 9453-05-C-0241. The Government may have rights to portions of this invention.

BACKGROUND OF THE INVENTION

Acceleration sensors typically use a proof mass to convert acceleration into force through Newton's law F=MA. In function, the accelerometer typically measures the force as an analog of acceleration.

The proof mass in the accelerometer is typically planar in form and has a flexure suspension permitting a single degree of motional freedom. In most accelerometers, this planar proof mass is surrounded by planar features (typically above and below the proof mass) known as "damping plates" or "cover plates", which serve to limit the permissible proof mass's travel and provide damping through squeeze-film-gas effects—see QFlex, resonating beam accelerometer (RBA), and microelectromechanical systems (MEMS) accelerometer.

The proof mass and damping plates are often made from insulating materials (e.g., fused silica, amorphous quartz, crystalline quartz, Pyrex, glass) that, when exposed to a suitable environment, can trap charge. Charge accumulated between the proof mass and damping plates results in an attraction or a repulsion force, which is indistinguishable from the Newtonian force and therefore results in an error in the accelerometer's output.

A prior-art solution to this problem is to apply a conductive metal film to the insulator surfaces to dissipate the accrued charge to electrical ground. In many cases, use of metal for this purpose is undesirable due to issues with metal stress, thickness, thermal expansion coefficient, and thermal conductivity, which lead to undesired output errors.

SUMMARY OF THE INVENTION

The present invention provides an accelerometer that reduces undesired attraction or repulsion forces between a proof mass and a cover. An exemplary accelerometer includes a proof mass, a base, a flexure that flexibly attaches the proof mass to the base, at least one double-ended tuning fork (DETF), attached at one end to the proof mass and at another end to the base, and a housing structure that encloses the proof mass within a cavity. A layer of graphene is located on at least a portion of the nonconductive surfaces within the housing structure.

In one aspect of the invention, the nonconductive surfaces include a surface on the proof mass, the housing structure, the base, the flexure, or the DETF.

In another aspect of the invention, the layer of graphene is attached to a heat sink and/or an electrical charge dissipation component.

As will be readily appreciated from the foregoing summary, the invention provides improved performing accelerometers.

BRIEF DESCRIPTION OF THE DRAWING

Preferred and alternative embodiments of the present invention are described in detail below with reference to the following drawing:

FIGURE is a side view of a resonating-beam accelerometer formed in accordance with the present invention.

DETAILED DESCRIPTION OF THE INVENTION

As shown in the FIGURE, an accelerometer 20 includes one or more very thin monocrystalline layers of graphene 60, 66 deposited on appropriate nonconductive parts. The exemplary accelerometer 20 includes a proof mass 42 that is flexibly connected to a base 44 by a flexure 46. Two resonating devices 52, 54 connect between the proof mass 42 and the base 44. The resonating devices 52, 54 are preferably double-ended tuning forks (DETFs). Covers 48, 50 attach to the base 44 in order to seal the active components. This seal may be a hermetic seal.

Graphene is the monolayer form of graphite. Graphene deposits as a single crystal when deposited on a single-crystal quartz substrate. Control of the amount of time of the deposition of carbon will control whether only a monolayer is formed. Each graphene layers 60, 66 is continuous and less than 1 nanometer (nm) in thickness. The electrical conductivity of graphene is higher than that of any metal. A monolayer of graphene quickly dissipates any static charges that may occur. One way to dissipate a built up charge or heat is through a via (see FIGURE). The via is then grounded on a circuit board or some other structure or attached to a heat sink.

Another way is by applying a graphene coat to the entire surfaces of one or all of the base 44 or the covers 48, 50. The outer surface of the base 44 or the covers 48, 50 is then grounded on a circuit board or some other structure or attached to a heat sink.

The room-temperature thermal conductivity of graphene is an order of magnitude higher than that of even the most thermally conducting metals. Thus, the high thermal conductivity of the graphene allows for graphene-coated parts to quickly reach thermal equilibrium.

Graphene is deposited using an epitaxial deposition tool to the nonconductive surfaces likely to create errors when subjected to charge accumulation. The nonconductive surfaces include, but are not limited to, inner walls of the covers 48, 50 and the top and bottom surfaces of the proof mass 42. In one embodiment, the graphene layer 60, 66 are applied to the desired surfaces before the covers 48, 50 are attached to the base 44. Graphene deposited on the flexure 46 will not adversely affect flexure operation. Every exposed surface shown in the FIGURE can be, at least partially, covered with graphene. Common masking techniques are used in order to make sure graphene does for on undesired surfaces. Black Magic by Aixtron makes a graphene deposition tool.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vibrating-beam accelerometer comprising:
   a proof mass;
   a base;
   a flexure configured to flexibly attach the proof mass to the base;
   at least one double-ended tuning fork (DETF) attached at one end to the proof mass and at another end to the base;
   a housing structure configured to enclose the proof mass within a cavity;

a layer of graphene located on at least a portion of nonconductive surfaces located within the housing structure.

2. The accelerometer of claim 1, wherein the nonconductive surfaces comprise a surface on at least one of the proof mass or the housing structure.

3. The accelerometer of claim 1, wherein the layer of graphene is located on at least one of an interior surface of the base and the proof mass.

4. The accelerometer of claim 1, further comprising at least one heat sink, wherein the layer of graphene is attached to the at least one heat sink.

5. The accelerometer of claim 1, further comprising at least one electrical charge dissipation component, wherein the layer of graphene is attached to the at least one electrical charge dissipation component.

6. A method comprising:
depositing at least one area of graphene to at least a portion of the nonconductive surfaces in an accelerometer comprising:
   a proof mass;
   a base;
   a flexure configured to flexibly attach the proof mass to the base;
   at least one double-ended tuning fork (DETF) attached at one end to the proof mass and at another end to the base; and
   a housing structure configured to enclose the proof mass within a cavity; and
connecting the one or more areas of graphene to at least one of a heat sink or an electrical charge dissipation component.

7. The method of claim 6, wherein depositing comprises depositing the graphene prior to attaching the housing structure to the base.

* * * * *

UNITED STATES PATENT AND TRADEMARK OFFICE
CERTIFICATE OF CORRECTION

PATENT NO.         : 8,485,032 B2                                          Page 1 of 1
APPLICATION NO.    : 13/047008
DATED              : July 16, 2013
INVENTOR(S)        : John S. Starzynski It is certified that error appears in the above-identified patent and that said Letters Patent is hereby corrected as shown below:

In the Specification, col 1, line 8: "The Government may have rights" should be changed to
-- The Government has certain rights --

Signed and Sealed this
Fifth Day of April, 2016

Michelle K. Lee
*Director of the United States Patent and Trademark Office*